(12) United States Patent
Chavan et al.

(10) Patent No.: US 10,035,086 B2
(45) Date of Patent: Jul. 31, 2018

(54) FILTER CARTRIDGE FOR CLEAN SERVICING

(71) Applicant: Cummins Filtration IP, Inc., Columbus (IN)

(72) Inventors: Priti V. Chavan, Pune (IN); Jayant Singh, Pune (IN); Wassem Abdalla, Cookeville, TN (US); Santosh R. Kharat, Pune (IN); Anil I. Sawant, Pune (IN)

(73) Assignee: CUMMINS FILTRATION IP, INC., Columbus, IN (US)

( * ) Notice: Subject to any disclaimer, the term of this patent is extended or adjusted under 35 U.S.C. 154(b) by 177 days.

(21) Appl. No.: 15/150,017

(22) Filed: May 9, 2016

(65) Prior Publication Data

US 2016/0332098 A1 Nov. 17, 2016

Related U.S. Application Data

(60) Provisional application No. 62/159,735, filed on May 11, 2015.

(51) Int. Cl.
*B01D 29/46* (2006.01)
*B01D 35/143* (2006.01)
*B01D 35/153* (2006.01)
*B01D 35/30* (2006.01)
*B01D 29/96* (2006.01)

(52) U.S. Cl.
CPC ........... *B01D 29/96* (2013.01); *B01D 35/143* (2013.01); *B01D 35/153* (2013.01); *B01D 35/30* (2013.01); *B01D 2201/291* (2013.01); *B01D 2201/4053* (2013.01)

(58) Field of Classification Search
None
See application file for complete search history.

(56) References Cited

U.S. PATENT DOCUMENTS

| | | | | |
|---|---|---|---|---|
| 4,923,601 A * | 5/1990 | Drori | .................. | B01D 29/114 210/107 |
| 6,139,607 A * | 10/2000 | Coulonvaux | ...... | B01D 46/0002 55/498 |
| 6,706,181 B1 * | 3/2004 | Baumann | ............... | B01D 29/21 210/236 |
| 7,540,957 B1 * | 6/2009 | Kurth | .................. | B01D 61/025 156/293 |
| 8,562,830 B2 * | 10/2013 | Reid | ..................... | B01D 35/30 210/232 |
| 9,314,724 B2 * | 4/2016 | Girondi | .................. | B01D 29/15 |
| 9,718,019 B2 * | 8/2017 | Baseotto | ............ | B01D 46/2414 |

(Continued)

*Primary Examiner* — Krishnan S Menon
(74) *Attorney, Agent, or Firm* — Foley & Lardner LLP

(57) ABSTRACT

A filter cartridge for use within a filter housing of a filter assembly that includes a filter media, a first endplate attached to a first end of the filter media, and a second endplate attached to a second end of the filter media. The second endplate includes a plurality of extensions extending axially away from a surface of the second endplate. The plurality of extensions possess a toothed profile and are sized and positioned so as to engage with at least one rib associated with a portion of the filter housing such that, when at least one of the plurality of extensions is engaged with the at least one rib, a rotation of the portion of the filter housing in a first direction results in a corresponding rotation of the filter cartridge.

22 Claims, 6 Drawing Sheets

(56) References Cited

U.S. PATENT DOCUMENTS

| | | | |
|---|---|---|---|
| 2001/0023843 A1* | 9/2001 | Senner | B01D 27/08 210/232 |
| 2002/0170279 A1* | 11/2002 | Gustafson | B01D 29/055 55/510 |
| 2004/0144710 A1* | 7/2004 | Bassett | B01D 27/08 210/234 |
| 2011/0203985 A1* | 8/2011 | Reid | B01D 35/301 210/236 |
| 2011/0259808 A1* | 10/2011 | Oelschlaegel | B01D 35/153 210/232 |
| 2013/0075319 A1* | 3/2013 | Roesgen | B01D 29/21 210/232 |

* cited by examiner

FILTER CARTRIDGE FOR CLEAN SERVICING

CROSS-REFERENCE TO RELATED APPLICATIONS

The present application claims priority to U.S. Provisional Patent Application No. 62/159,735, filed May 11, 2015 and the contents of which are incorporated herein by reference in its entirety and for all purposes.

FIELD

The present application relates to a filter cartridge for use within a filter housing of a filter assembly.

BACKGROUND

While servicing or replacing filter cartridges in filter assemblies, the fluid being filtered, such as a fuel, may be spilled from the filter assembly. For example, the filter cartridge may stick or remain in a portion (such as the top portion or head) of the filter housing of the filter assembly while the filter assembly is being serviced, and this action may cause the fluid to spill. This may result in difficult and unclean servicing.

SUMMARY

Various embodiments provide a filter cartridge for use within a filter housing of a filter assembly. The filter cartridge comprises a filter media, a first endplate attached to a first end of the filter media, and a second endplate attached to a second end of the filter media. The plurality of extensions possess a toothed profile and are sized and positioned so as to engage with at least one rib associated with a portion of the filter housing such that, when at least one of the plurality of extensions is engaged with the at least one rib, a rotation of the portion of the filter housing in a first direction results in a corresponding rotation of the filter cartridge.

Various other embodiments provide for a filter assembly that includes a filter housing and a filter cartridge. The filter cartridge is positionable within the filter housing. The filter cartridge comprises a filter media, a first endplate attached to a first end of the filter media, and a second endplate attached to a second end of the filter media. The second endplate includes a plurality of extensions that extend axially away from a surface of the second endplate. Each the plurality of extensions possesses a toothed profile and is sized and positioned so as to engage with at least one rib associated with a portion of the filter housing such that, when at least one of the plurality of extensions is engaged with the at least one rib, a rotation of the portion of the filter housing in a first direction results in a corresponding rotation of the filter cartridge.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to a filter cartridge with an endplate. The filter cartridge may be used within a filter housing of a filter assembly. More specifically, the filter cartridge described herein may be used may rotate congruently with at least a portion of the filter housing due to extensions on the endplate interlocking with ribs within the filter housing. Accordingly, the filter assembly may be serviced or replaced in a clean manner (e.g., without spilling).

Figure 1A:
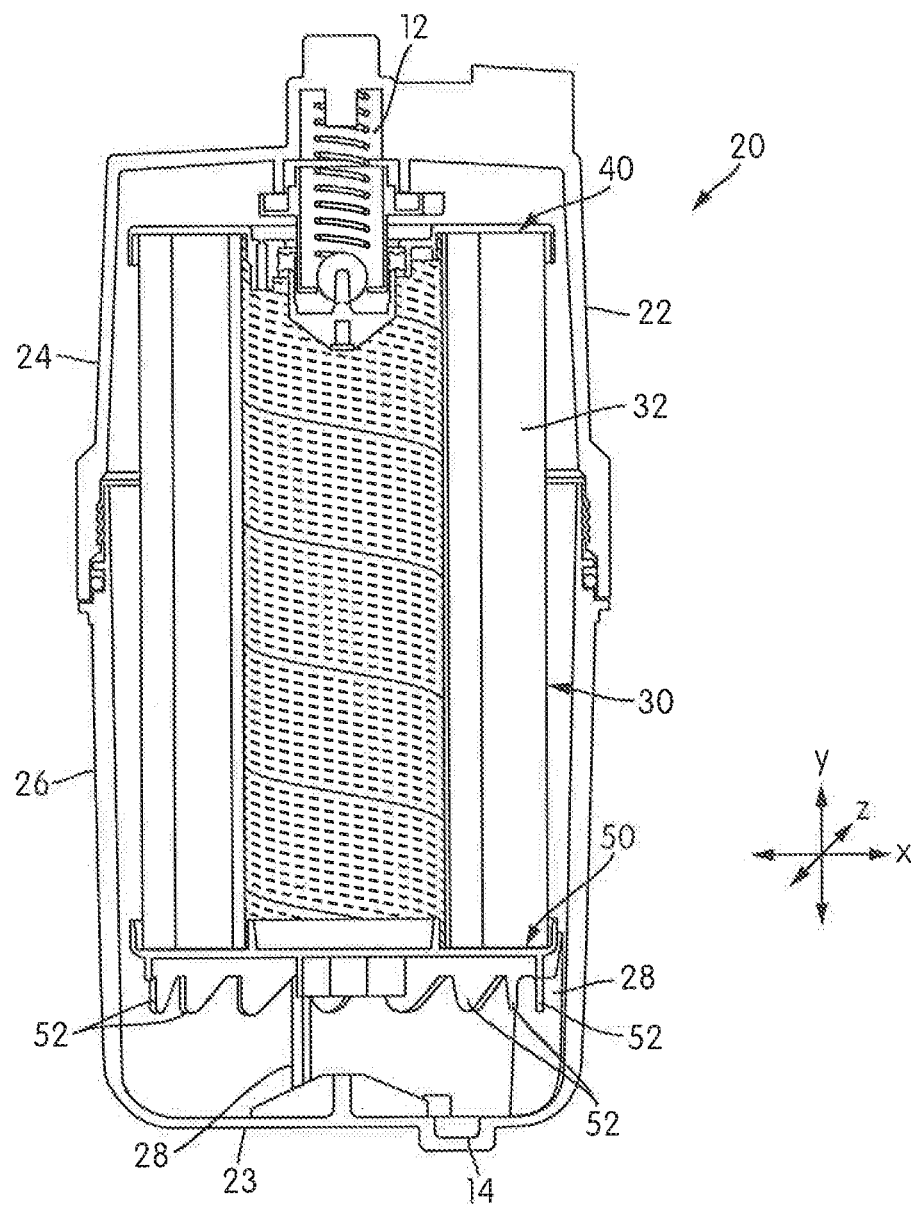
FIG. 1A is a cross-sectional view of a filter assembly with a filter cartridge according to one embodiment.
Figure 1B:
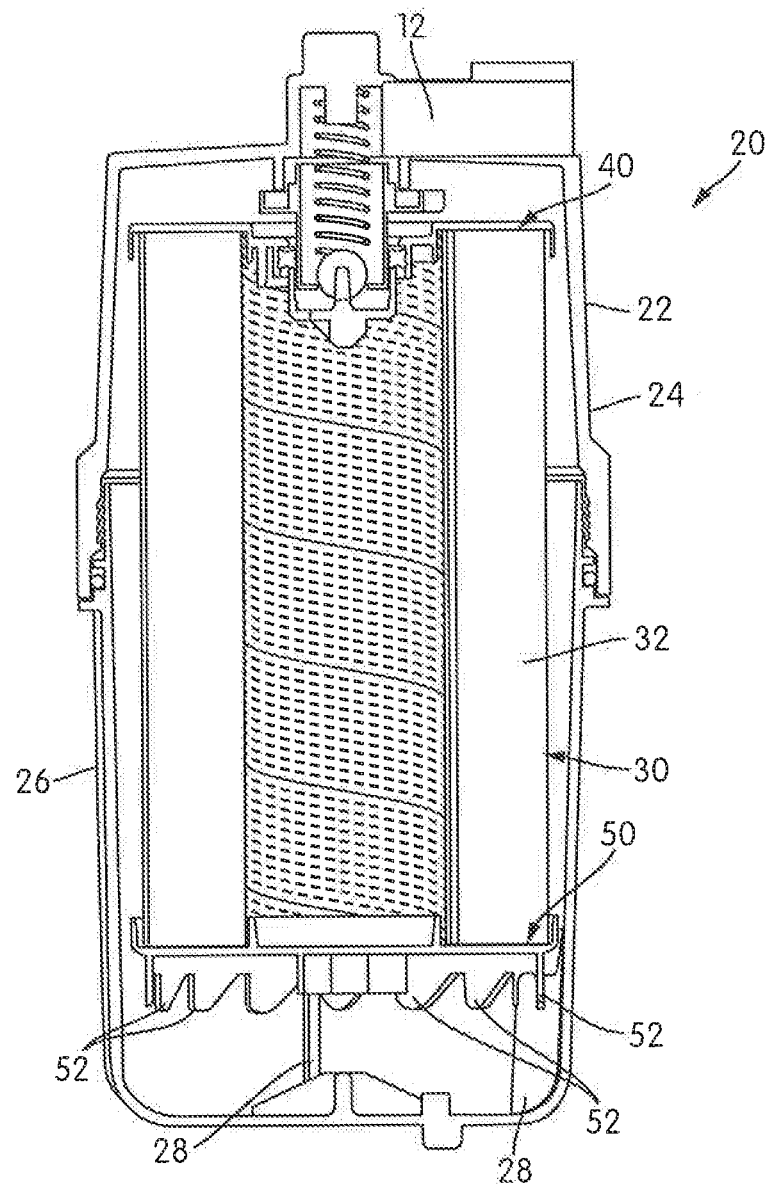
FIG. 1B is another cross-sectional view of the filter assembly of FIG. 1A.
Figure 1C:
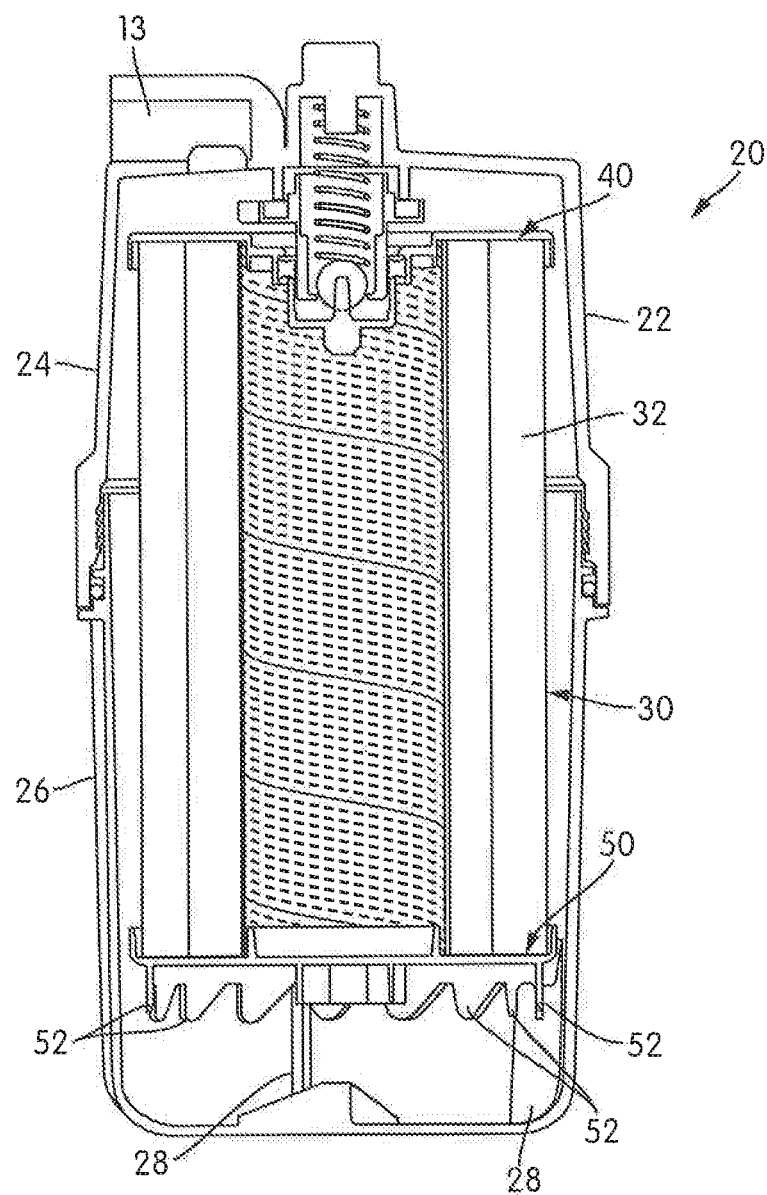
FIG. 1C is yet another cross-sectional view of the filter assembly of FIG. 1A.

Referring to FIGS. 1A-1C, there is shown a filter cartridge 30 within a filter assembly 20, according to one embodiment. The filter cartridge 30 may be placed and secured within a filter shell or housing 22 of the filter assembly 20 in order to filter certain fluids, such as fuel.

Filter Housing

The filter housing 22 may substantially surround the filter cartridge 30 such that the fluid being filtered is forced to move through the filter cartridge 30. The filter housing 22 may include multiple parts, such as a head assembly or first portion or top shell 24 and a second portion or bottom shell 26, in order to surround the filter cartridge 30. The top shell 24 and the bottom shell 26 may be removably attached to each other in order to allow the filter assembly 20 to be serviced and the inside of the filter assembly 20 to be accessed. For example, as shown in FIGS. 1A-1C, the top shell 24 and the bottom shell 26 may each be threaded with internal and external threads such that the top shell 24 and the bottom shell 26 screw together to seal the housing 22 together and can be unscrewed to open the housing 22 for servicing (e.g., to replace the filter cartridge 30 or to clean the filter assembly 20).

As shown in FIGS. 1A-1B, the top shell 24 includes a first opening, such as a filter outlet 12. As shown in FIG. 1C, the top shell 24 also includes a second opening, such as a filter inlet 13. As shown in FIG. 1A, the bottom shell 26 includes a water drain outlet 14. However, it is anticipated that the filter outlet 12, the filter inlet 13, and the water drain outlet 14 can be reversed and/or rearranged onto other areas of the housing 22.

The filter housing 22 may include at least one extension, protrusion, lip, or rib 28 that the filter cartridge 30 engages with, as described further herein. As shown in FIGS. 1A-1C and 2A, each rib 28 may be located along a lower portion of the inside wall of the bottom shell 26 of the housing 22, although it is anticipated that the ribs 28 may be located in a variety of different areas within the housing 22. Although the individual ribs 28 are shown as being evenly spaced from each other in a radial direction around the inner periphery of a lower portion of the bottom shell 26, it is also possible for the spacing between the ribs 28 to vary. The ribs 28 may extend radially inward from an inner surface of a sidewall of the bottom shell 26 into an inner region of the housing 22 such that the ribs 28 are configured to directly contact and support the filter cartridge 30.

Figure 2A:
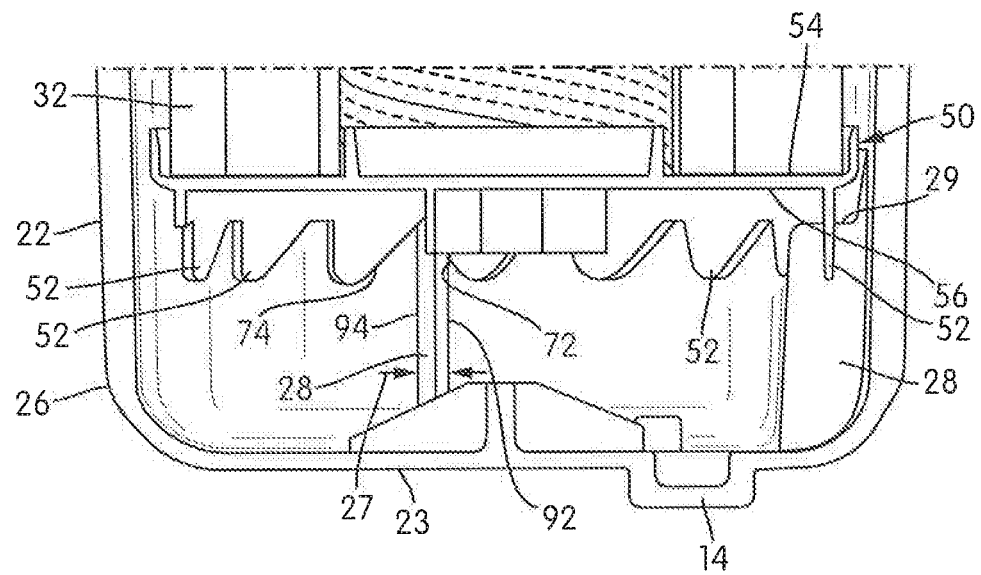
FIG. 2A is an enlarged, cross-sectional view of the bottom endplate of the filter cartridge within the filter assembly of FIG. 1A.

As shown in FIG. 2A, each of the ribs 28 includes a top surface 29 that the filter cartridge directly contacts or abuts for support within the housing 22. Each of the ribs 28 extends axially approximately the same distance from the bottom end wall 23 of the bottom shell 26 of the housing 22 such that the top surfaces 29 of the ribs 28 are at approximately the same height. The height of the ribs 28 may determine where the filter cartridge 30 is held axially within the housing 22 relative to the bottom end wall 23 of the housing 22 and the amount of space between the bottom of the filter cartridge 30 and the bottom end wall 23 of the housing 22.

Filter Cartridge

The filter cartridge 30 includes a filter media 32, a top endplate 40, and a bottom endplate 50. The filter media 32 may be used to filter the fluid moving through the filter assembly 20 and may be configured for inside-out filtering or outside-in filtering. The filter media 32 may optionally be configured in a ring and may circumscribe a central axis (i.e., the vertical or y-axis that extends axially through the filter cartridge, as shown in FIG. 1A).

As shown in FIGS. 1A-1C and 3A, the top endplate 40 of the filter cartridge 30 is attached to a top portion or end of the filter media 32 to attach the filter cartridge 30 to an opening, such as an inlet or outlet, of the filter housing 22. The bottom side of the top endplate 40 is configured to attach with the filter media 32, while the top side of the top endplate 40 is configured to attach to or engage with the top shell 24 of the filter housing 22. The top endplate 40 includes an annular portion 62 directly attached to the filter media 32 that defines a central opening 64 that provides a fluid passage into or out from the filter media 32.

As shown in FIGS. 1A-1C and 2A, the bottom endplate 50 of the filter cartridge 30 is attached to a lower or bottom portion or end of the filter media 32 to provide support to the filter media 32 and to allow the filter cartridge 30 to attach and engage with the filter housing 22. According to one embodiment, the bottom endplate 50 may be a filter water separator (FWS) endplate. A top side 54 of an end wall 55 of the bottom endplate 50 is configured to face and attach with the filter media 32, while a bottom side 56 of the end wall 55 of the bottom endplate 50 faces away from the filter media 32 and is configured to attach or engage with the filter housing 22. In the embodiments depicted herein, both the bottom endplate 50 and the top endplate 40 are fixedly and non-removably secured to the respective ends of the filter media 32.

Figure 2B:
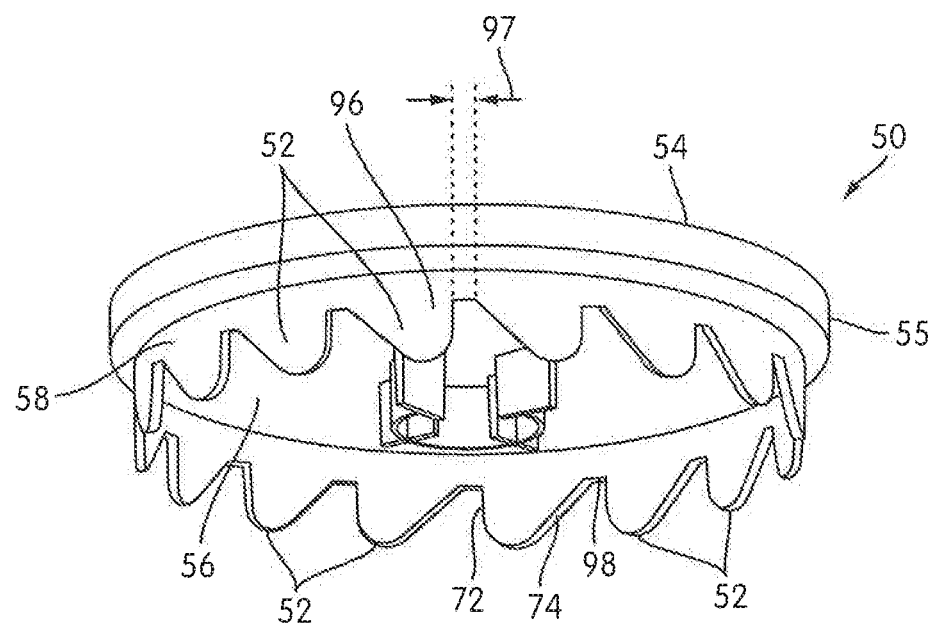
FIG. 2B is a perspective view of the bottom endplate of the filter cartridge of FIG. 1A.

As shown in FIGS. 2A-2B, the bottom endplate 50 includes a plurality of extensions 52 in order to engage with the filter housing 22. As depicted in FIG. 1A, for example, multiple extensions 52 may extend axially (i.e., along the y-axis as shown in FIG. 1A) downward from the bottom side 56 of the end wall 55 of the bottom endplate 50. However, it is also anticipated that the extensions 52 could extend from other areas, such as from the sides of the bottom endplate 50 or from the top endplate 40, and may extend in different directions from the filter cartridge 30, such as horizontally or at an angle.

Multiple extensions 52 are positioned along and extend from the periphery (or just inside of the periphery) of the bottom side 56 of the bottom endplate 50 in order to engage with ribs 28 on the bottom shell 26 of the housing 22. Accordingly, the filter cartridge 30 may be positioned within and engage with the filter housing 22 in multiple different rotational positions (e.g., the ribs 28 may engage with different extensions 52). The extensions 52 are spaced apart from each other along the periphery of the bottom side 56 of the end wall 55 of the bottom endplate 50. Accordingly, a respective one of the ribs 28 can fit securely between and interlock with two of the extensions 52 with minimal (if any) movement between the extensions 52 and the ribs 28 such that relative movement between the filter cartridge 30 and the bottom shell 26 of the filter housing 22 is prevented during normal use (e.g., while the top shell 24 and the bottom shell 26 are completely attached) and when the bottom shell 26 is rotated in the first direction.

The extension 52 may engage with all or some of the ribs 28 of the housing 22. Although the individual extensions 52 in FIGS. 1A-2B are shown as being evenly spaced from each other in a radial direction, it is also possible for the spacing between the extensions 52 to vary. The individual extensions 52 may be arranged in a configuration that runs substantially parallel to the outer periphery of the bottom endplate 50 and the outer periphery of the filter media 32. In FIGS. 1A-2B, for example, the extensions 52 are collectively arranged in a substantially circular arrangement.

Figure 4:
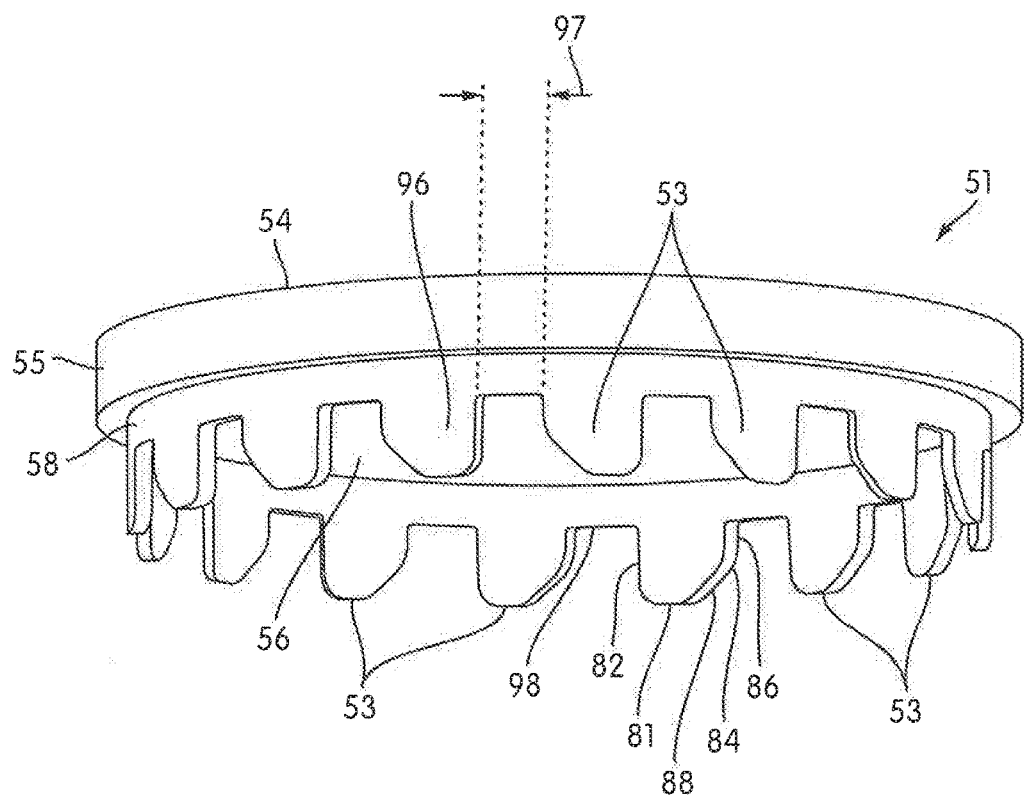
FIG. 4 is a perspective view of a bottom endplate according to another embodiment.

According to one embodiment as shown in FIGS. 2B and 4, a base 96 of each of the extensions 52 may extend directly from a ring 58 that extends from the bottom side 56 of the end wall 55. Accordingly, when the filter cartridge 30 is positioned within the housing 22, the top surface 29 of the ribs 28 may directly contact and engage with a bottom surface of the ring 58 in an area or gap 98 between two extensions 52. However, it is understood that the base 96 of each of the extensions 52 may extend directly from the bottom side 56 of the end wall 55 and the top surface 29 of the ribs 28 may directly contact and engage with the bottom side 56 of the end wall 55 in the gap 98 between two extensions 52.

As shown in FIGS. 2A-2B, the distance 97 (within the region of the gap 98) between the bases 96 of two of the extensions 52 may be sized according to the width 27 of the ribs 28, For example, the distance 97 between the bases 96 of two of the extensions 52 may be approximately equal to the width 27 of the ribs 28. Accordingly, one of the ribs 28 fits securely in the gap 98 between the bases 96 of two of the extensions 52 and relative movement in both directions between the filter cartridge 30 and the bottom shell 26 of the housing 22 is prevented when the extensions 52 and the ribs 28 are engaged during normal use (e.g., while the top shell 24 is completely attached to the bottom shell 26) and when the bottom shell 26 is rotated in the first direction.

The extensions 52 may be shaped and profiled in a variety of different configurations. In order for the filter cartridge 30 to rotate congruently with the filter housing 22 when the bottom shell 26 is rotated in the first direction and for the filter cartridge 30 to not rotate congruently with the filter housing 22 when the bottom shell 26 is rotated in the second direction, each of the extensions 52 are asymmetrical about a vertical line parallel to the y-axis and extending through the center of each of the extensions 52. Accordingly, one side (i.e., the vertical side 72) forces the filter cartridge 30 to move with the bottom shell 26 and the other side (i.e., the angled side 74) allows the filter cartridge 30 and the bottom shell 26 to move relative to each other.

For example, in the embodiment depicted in FIG. 2B, the extensions 52 have an angled side 74 and a substantially vertical side 72 so to permit the filter cartridge 30 to be removed from the bottom shell 26 if rotated in a particular direction, as described further herein. The vertical side 72 extends substantially parallel to the y-axis and the angled side 74 is at least partially angled relative to the vertical side 72 and the y-axis, thereby creating the toothed profile. The vertical side 72 and the angled side 74 are on opposite sides of the extension 52. The angled side 74 of one of the extensions 52 is angled or slopes away from the vertical side 72 of an adjacent one of the extensions 52 such that when the bottom shell 26 is moved in the second direction, the rib 28 moves along the length of the angled side 74 as the bottom shell 26 moves. The extensions 52 are sized and spaced relative to each other to fit one of the ribs 28 between the angled side 74 of one of the extensions 52 and the vertical side 72 of another one of the extensions 52.

While the embodiment depicted in FIGS. 1A-2B shows the extensions 52 as possessing a tooth-shaped profile with a vertical side 72 and an angled side 74, other profiles for the extensions 52 are also possible. For example, FIG. 4 depicts an alternative embodiment of a bottom endplate 51 with multiple extensions 53 which also have a toothed profile. The extensions 53 may be relatively more spaced apart along the bottom side 56 of the bottom endplate 50 and may have a lower horizontal side 81, a vertical side 82, and an angled side 84. The angled side 84 includes a vertical portion 86 and an angled portion 88 so as to allow the filter cartridge 30 to be removed from the filter housing 22 when the bottom shell 26 is rotated in the second direction (as described further herein). The vertical portion 86 is positioned between and directly connects the angled portion 88 and the ring 58 or the bottom side 56 of the bottom endplate 51. The angled portion 88 is positioned between and directly connects the vertical portion 86 and the horizontal side 81. The horizontal side 81 is positioned between and directly connects the vertical side 82 and the angled side 84 such that the vertical side 82 and the angled side 84 are on opposite radial sides of the extension 53. The vertical portion 86 and the vertical side 82 extend substantially parallel to the y-axis and to each other from the bottom endplate 51. The angled portion 88 is angled relative to the vertical portion 86 and the y-axis. Although the extensions 52 are referred to herein, it is understood that the extensions 53 may optionally be used in place of the extensions 52.

Interaction Between the Filter Cartridge and the Filter Housing

As shown in FIGS. 1A-1C and 2A, when the filter cartridge 30 is properly placed into or positioned within an inner region of the filter housing 22, the extensions 52 engage or interlock with the ribs 28. The filter cartridge 30 may rest directly on and be supported by the ribs 28 (via the extensions 52), which may position the filter cartridge 30 over, for example a clear bowl which serves as the bottom shell 26.

When the extensions 52 and the ribs 28 are engaged with each other, the filter cartridge 30 and at least a portion of the housing 22 are rotationally locked together in a first direction, such that the filter cartridge 30 and at least a portion of the housing 22 rotate together due to the shape of the extensions 52. For example, when the bottom shell 26 is rotated relative to the top shell 24 in the first direction, the filter cartridge 30 will rotate congruently with the bottom shell 26 relative to the top shell 24, allowing the filter cartridge 30 (and bottom shell 26) to be easily removed from the top shell 24 for servicing or removal. Accordingly, the filter cartridge 30 will remain rotationally attached to the bottom shell 26 as the bottom shell 26 is being attached or removed from the top shell 24 for servicing. Therefore, while the filter assembly 20 is being serviced, any spillage of liquid (e.g., fuel) is avoided, ensuring a clean servicing.

More specifically, when the filter cartridge 30 and the bottom shell 26 of the filter housing 22 are engaged and the bottom shell 26 is moved or rotated in a first rotational direction, the filter cartridge 30 and the bottom shell 26 rotate congruently in the first direction. For example, as shown in FIG. 2A, one of the ribs 28 is positioned or fits between an angled side 74 of one extension 52 and a vertical side 72 of another extension 52 when the extensions 52 and ribs 28 are engaged. If the bottom shell 26 is rotated in the first direction, a first side 92 of one of the ribs 28 will abut the vertical side 72 of one of the extensions 52 and prevent the filter cartridge 30 from rotating relative to the bottom shell 26, thereby forcing the filter cartridge 30 and the bottom shell 26 to rotate congruently.

Conversely, when the bottom shell 26 is moved or rotated in a second rotational direction (where the first direction and the second direction are opposite each other), the filter cartridge 30 and the bottom shell 26 do not rotate congruently and instead the bottom shell 26 rotates relative to and separates from the filter cartridge 30. For example, if the bottom shell 26 is rotated in the second direction (relative to FIGS. 1A-2B), a second side 94 of the rib 28 will abut the angled side 74 of a second extension 52. Due to the shape and slope of the angled side 74, the rib 28 will move along the length of the surface of the angled side 74 as the bottom shell 26 is rotated in the second direction, which will push the filter cartridge 30 upward (relative to the bottom shell 26) and away from the ribs 28 so as to separate the filter cartridge 30 and the bottom shell 26. The filter cartridge 30 is moved away and separated further from the bottom end wall 23 of the bottom shell 26 of the housing 22, thereby preventing the filter cartridge 30 and the bottom shell 26 from rotating congruently.

According to one embodiment, the top shell 24 may be removed from the bottom shell 26 by rotating the bottom shell 26 of the housing 22 in the first direction relative to the top shell 24. Due to the attachment between the bottom shell 26 and the filter cartridge 30 (as described above), the filter cartridge 30 remains attached to and supported by the bottom shell 26 (e.g., the ribs 28 remain positioned within the gap 98 between two extensions 52) as the bottom shell 26 and the top shell 24 are being separated and after complete separation. Accordingly, the filter cartridge 30 rotates congruently with the bottom shell 26 and rotates (with the bottom shell 26) relative to the top shell 24 when the top shell 24 is being removed from the bottom shell 26.

No Filter No Run Valve

Figure 3A:
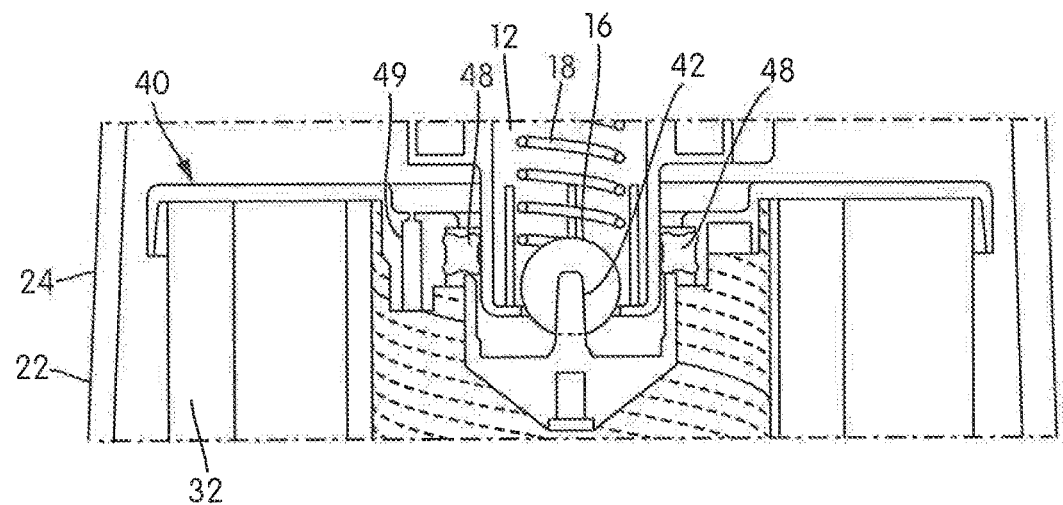
FIG. 3A is an enlarged, cross-sectional view of the top endplate of the filter cartridge within the filter assembly of FIG. 1A.
Figure 3B:
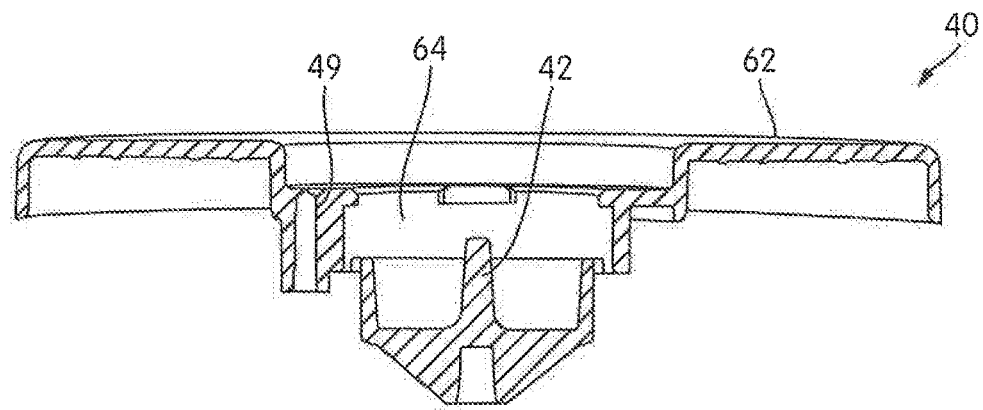
FIG. 3B is a cross-sectional view of the top endplate of the filter cartridge of FIG. 1A.

As shown in FIGS. 1A-1C and 3A-3B, the top side of the top endplate 40 includes a "no filter no run" (NFNR) valve actuation pin 42 that extends vertically upward from the top side of the top endplate 40. As shown in FIG. 3A, the top shell 24 of the housing 22 includes a NFNR assembly (including an opening (e.g., the outlet 12) with a ball or stopper 16 and a spring 18) to engage with the pin 42 (the NFNR assembly and the pin 42 have complementary geometry). The stopper 16 is configured to control the passage of fluid through the outlet 12 of the housing 22 by moving within the outlet 12 between a closed position (in which the stopper 16 is sealed with the fluid aperture of the outlet 12) and an open position (in which the stopper 16 is not sealed with the fluid aperture to allow fluid to flow through the outlet 12). Due to the spring 18, the stopper 16 is biased to move toward or into the closed position. The valve actuation pin 42 and the NFNR assembly ensure that only certain filter cartridges 30 can be placed within the housing 22 during assembly or after servicing and further ensure that the filter cartridge 30 is correctly installed. When the filter cartridge 30 is correctly installed within the housing 22 and the top shell 24 and the bottom shell 26 are completely attached to each other, the outlet 12 is opened to allow the passage of fluid through the outlet 12.

The pin 42 is sufficiently long and fits within the outlet 12 such that the pin 42 dislodges or moves the stopper 16 when the correct filter cartridge 30 is correctly installed within the housing 22 and the top shell 24 and the bottom shell 26 are completely attached to each other. More specifically, when the filter cartridge 30 is properly installed within the housing 22 and the top shell 24 is attached to the bottom shell 26, the valve actuation pin 42 interacts with the top shell 24 of the housing 22 such that the pin 42 extends into the filter outlet 12 of the housing 22, which moves or pushes the stopper 16 upwards from the closed position into the open position, compresses the spring 18 into the filter outlet 12, and opens the filter outlet 12, thereby allowing the passage of fluid through the filter outlet 12 from the filter cartridge 30. If no filter cartridge 30 is installed in the housing 22, if the filter cartridge 30 is not properly installed in the housing 22, or if an incorrect filter cartridge is installed in the housing 22, the pin 42 does not extend into the outlet 12 and accordingly will not be able to move the stopper 16. The stopper 16 will automatically move into the closed position (due to the spring 18), which closes the filter outlet 12 and prevents the flow of fluid through the filter outlet 12. The pin 42 may also help guide the filter cartridge 30 to the filter outlet 12.

As shown in FIG. 3A, the top endplate 40 may also include an air vent 49 to allow excess gas to escape from within the filter cartridge 30, when, for example, the filter cartridge 30 is being used to filter liquid. A quad seal 48 is positioned on top of the top endplate 40 in order to ensure a proper and full seal between the top endplate 40 and the filter outlet 12 of the housing 22.

The various components of the filter cartridge 30 may be constructed out of a variety of materials. For example, the top endplate 40 and the bottom endplate 50 may be constructed out of a variety of materials, including but not limited to plastic or metal.

It is anticipated that the various components, configurations, systems, methods, and features of the various embodiments may be combined or used alone according to the desired use and configuration.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. Additionally, it should also be understood that features disclosed in different embodiments may be combined into yet further embodiments not necessarily depicted or described herein. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter cartridge for use within a filter housing of a filter assembly comprising:
    a filter media;
    a first endplate attached to a first end of the filter media; and
    a second endplate attached to a second end of the filter media, the second endplate including a plurality of extensions extending axially away from a surface of the second endplate, each the plurality of extensions possessing a toothed profile and being sized and positioned so as to engage with at least one rib associated with a portion of the filter housing such that, when at least one of the plurality of extensions is engaged with the at least one rib, a rotation of the portion of the filter housing in a first direction results in a corresponding rotation of the filter cartridge,
    a distance between bases of two of the plurality of extensions being approximately equal to the width of the at least one rib of the filter housing such that, when at least one of the plurality of extensions is engaged with the at least on rib, relative movement between the filter cartridge and the portion of the filter housing is prevented while the portion of the housing is completely attached to the rest of the housing and when the portion of the filter housing is rotated in the first direction,
    the bases of the two of the plurality of extensions extending directly from and along the surface of the second endplate.

2. The filter cartridge of claim 1, wherein each of the plurality of extensions are asymmetrical such that, when the filter cartridge and the filter housing are engaged, the filter cartridge and the portion of the filter housing rotate congruently when the portion of the filter housing is moved in the first direction and do not rotate congruently when the portion of the filter housing is moved in a second direction that is opposite the first direction.

3. The filter cartridge of claim 1, wherein the at least one rib extends axially from the bottom end wall of the filter housing such that, when the portion of the filter housing is moved in a second direction that is opposite the first direction, the filter cartridge is moved away from a bottom end wall of the filter housing.

4. The filter cartridge of claim 1, wherein each of the plurality of extensions includes a substantially vertical side and an angled side, the vertical side extending substantially parallel to a vertical axis that extends axially through the filter cartridge, the angled side at least partially angled relative to the vertical side and the vertical axis.

5. The filter cartridge of claim 4, wherein the plurality of extensions are sized and spaced apart from each other such that a respective rib of the at least one rib fits between the angled side of one of the plurality of extensions and the vertical side of another one of the plurality of extensions, wherein, when the portion of the filter housing is moved in the first direction, a first side of the respective rib abuts the vertical side of the another one of the plurality of extensions such that the portion of the filter housing and the filter cartridge rotate congruently, and wherein, when the portion of the filter housing is moved in a second direction that is opposite the first direction, a second side of the respective rib abuts the angled side of the one of the plurality of extensions such that the portion of the filter housing rotates relative to the filter cartridge.

6. The filter cartridge of claim 5, wherein the angled side of the one of the plurality of extensions is angled away from the vertical side of the another one of the plurality of extensions such that, when the portion of the filter housing is moved in the second direction, the respective rib moves along the length of the angled side of the one of the plurality of extensions as the portion of the filter housing moves.

7. The filter cartridge of claim 4, wherein the angled side includes a vertical portion and an angled portion.

8. The filter cartridge of claim 1, wherein the plurality of extensions are positioned in a configuration that runs substantially parallel to a periphery of the second endplate.

9. The filter cartridge of claim 1, wherein the first endplate includes a valve actuation pin configured to open an opening of the filter housing when the filter cartridge has been properly installed within the filter housing.

10. A filter assembly comprising:
 a filter housing comprising at least one rib; and
 a filter cartridge positionable within the filter housing, the filter cartridge comprising a filter media, a first endplate attached to a first end of the filter media, and a second endplate attached to a second end of the filter media,
 the second endplate including a plurality of extensions extending axially away from a surface of the second endplate, each the plurality of extensions possessing a toothed profile and being sized and positioned so as to engage with the at least one rib associated with a portion of the filter housing such that, when at least one of the plurality of extensions is engaged with the at least one rib, a rotation of the portion of the filter housing in a first direction results in a corresponding rotation of the filter cartridge,
 a distance between bases of two of the plurality of extensions being approximately equal to the width of the at least one rib of the filter housing such that, when at least one of the plurality of extensions is engaged with the at least one rib, relative movement between the filter cartridge and the portion of the filter housing is prevented while the portion of the housing is completely attached to the rest of the housing and when the portion of the filter housing is rotated in the first direction,
 the bases of the two of the plurality of extensions extending directly from and along the surface of the second endplate.

11. The filter assembly of claim 10, wherein each of the plurality of extensions are asymmetrical such that, when the filter cartridge and the filter housing are engaged, the filter cartridge and the portion of the filter housing rotate congruently when the portion of the filter housing is moved in the first direction and do not rotate congruently when the portion of the filter housing is moved in a second direction that is opposite the first direction.

12. The filter assembly of claim 10, wherein the at least one rib extends axially from the bottom end wall of the filter housing such that, when the portion of the filter housing is moved in a second direction that is opposite the first direction, the filter cartridge is moved away from a bottom end wall of the filter housing.

13. The filter assembly of claim 10, wherein each of the plurality of extensions includes a substantially vertical side and an angled side, the vertical side extending substantially parallel to a vertical axis that extends axially through the filter cartridge, the angled side at least partially angled relative to the vertical side and the vertical axis.

14. The filter assembly of claim 13, wherein the plurality of extensions are sized and spaced apart from each other such that a respective rib of the at least one rib fits between the angled side of one of the plurality of extensions and the vertical side of another one of the plurality of extensions, wherein, when the portion of the filter housing is moved in the first direction, a first side of the respective rib abuts the vertical side of the another one of the plurality of extensions such that the portion of the filter housing and the filter cartridge rotate congruently, and wherein, when the portion of the filter housing is moved in a second direction that is opposite the first direction, a second side of the one of the respective rib abuts the angled side of the one of the plurality of extensions such that the portion of the filter housing rotates relative to the filter cartridge.

15. The filter assembly of claim 14, wherein, the angled side of the one of the plurality of extensions is angled away from the vertical side of the another one of the plurality of extensions such that when the portion of the filter housing is moved in the second direction, the respective rib moves along the length of the angled side of the one of the plurality of extensions as the portion of the filter housing moves.

16. The filter assembly of claim 13, wherein the angled side includes a vertical portion and an angled portion.

17. The filter assembly of claim 10, wherein the plurality of extensions are positioned in a configuration that runs substantially parallel to a periphery of the second endplate.

18. The filter assembly of claim 10, wherein the first endplate includes a valve actuation pin configured to open an opening of the filter housing when the filter cartridge has been properly installed within the filter housing.

19. The filter assembly of claim 18, wherein the opening of the filter housing includes a stopper configured to control passage of fluid through the opening by moving between a closed position and an open position, wherein the actuation pin of the first endplate is configured to move the stopper from the closed position to the open position to allow passage of fluid through the opening of the filter housing.

20. The filter assembly of claim 19, wherein the actuation pin fits within the opening of the filter housing such that, when the filter cartridge is installed within the filter housing, the actuation pin extends into the opening of the filter housing and the stopper is moved into the open position, and wherein the stopper is biased to move into the closed position such that, when the filter cartridge is not installed within the filter housing, the actuation pin does not extend into the opening of the filter housing and the stopper automatically moves into the closed position.

21. The filter assembly of claim 10, wherein the filter housing includes a first shell and a second shell that are removably attachable to each other, wherein the second shell is the portion of the filter housing, and wherein the filter cartridge is configured to rotate congruently with the second shell relative to the first shell when the first shell is being removed from the second shell.

22. The filter assembly of claim 10, wherein the at least one rib extends radially inward from an inner surface of a sidewall of the filter housing into a center region of the filter housing such that the at least one rib is configured to directly contact and support the filter cartridge.

\* \* \* \* \*